Oct. 20, 1942.   R. L. OHLS   2,299,341
VALVE
Filed March 3, 1941

R. L. Ohls.
INVENTOR.
By J. Vincent Martin
and
Ralph R. Browning.
ATTORNEYS

Patented Oct. 20, 1942

2,299,341

UNITED STATES PATENT OFFICE 2,299,341

VALVE

Robert L. Ohls, Houston, Tex., assignor to Reed Roller Bit Company, Houston, Tex., a corporation of Texas Application March 3, 1941, Serial No. 381,485

7 Claims. (Cl. 251—102)

This invention relates to valves and has particular reference to valves of the modified plug type.

It has heretofore been proposed that in valves of this type, the closure members be in the form of segments mounted upon a rotatable carrier and that these segments be radially movable with respect to the carrier so that they may be moved away from their seats before being rotated to open position, thus eliminating the tremendous friction which would otherwise exist between the segments and their seats due to the pressure of fluid thereagainst.

It has been proposed in connection with such valves that certain mechanical means be provided whereby an initial opening movement of the carrier will cause retraction of the closure segments. However, such expedients have under certain high pressure conditions been found ineffective to properly retract the segments from their seats prior to the opening movement of the valve.

It is an object of this invention to provide a means for positively retracting the closure segments of such valves from their seats prior to the opening movement thereof.

Another object of this invention is to provide a means whereby the retracting forces exerted upon the two segments will be balanced against each other and whereby the force exerted on each segment will be the same at each end thereof.

Other objects and advantages of this invention will become apparent from the following description taken in connection with the accompanying drawing wherein is set forth by way of example one embodiment of the invention.

Figure 1:
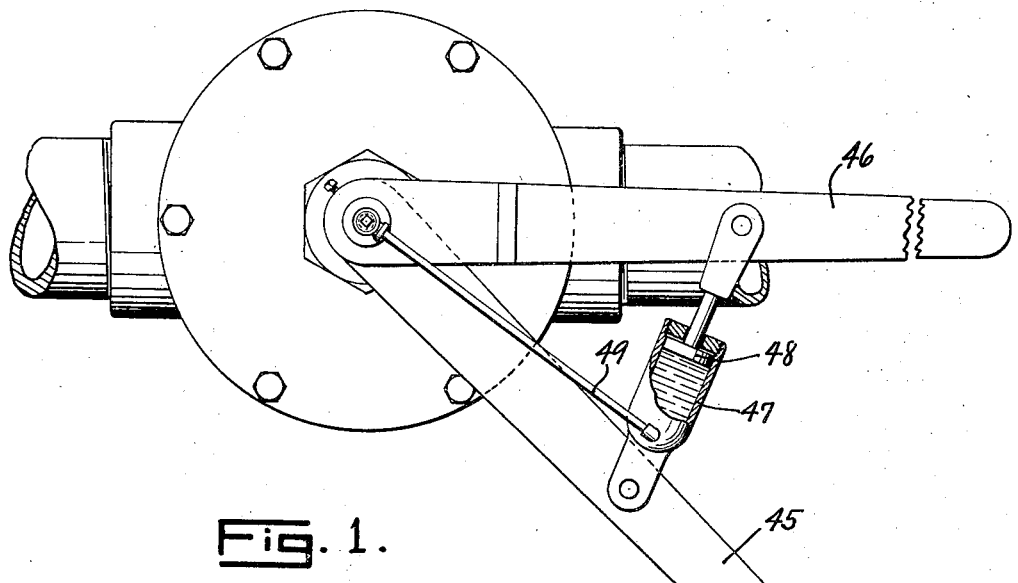
Fig. 1 is a top plan view of a valve constructed in accordance with this invention, a small portion thereof being broken away and shown in cross section for purposes of illustration.

The valve body 1 is in the usual manner provided with openings 2 and 3, either of which may be the outlet and the other the inlet, these openings in turn being adapted to receive pipes 4 and 5. Threaded connections are illustrated for these pipes, but it will be understood that any suitable form of connection may be employed.

The body 1 is formed with a substantial cylindrical valve chamber 6, the latter having valve seats 7 formed on its wall around the respective openings 2 and 3. At its lower end the valve body is formed with a socket 8 adapted to receive the pintle 9 on the lower end of the valve carrier 10, which is rotatable within the chamber 6. The carrier 10 has a hollow stem 11 at its upper end which is rotatably mounted within the cover plate 12 of the valve. The cover plate is secured in position by means of cap screws 13, or the like, and suitable packing 14 is placed around the valve stem to prevent leakage.

The carrier 10 is provided at its upper end with two pairs of oppositely extending projections or guides 15 and 16 respectively, and at its lower end is provided with two similar pairs of oppositely projecting guides 17 and 18 respectively. The closure segments 19 and 20, which are adapted to seat upon the seats 7 and close the openings 2 are carried by these projections 15, 16, 17 and 18. Thus, the closure member 19 has an upwardly extending part 21 which lies between the two projections 15 and a downwardly extending part 22 which lies between the projections 17, whereas the segment 20 has an upwardly extending part 23 lying between the projections 16 and a downwardly extending part 24 lying between the projections 18. Thus, the segments 19 and 20 may move toward and away from the center of rotation of the carrier 10 in a radial direction, but are caused to rotate with the carrier 10 by means of the inter-engagement just described. Each of the projections 21, 22, 23 and 24 on the respective closure members is provided with a hook-shaped part, designated 25, 26, 27 and 28 respectively, which extends inwardly toward the axis of rotation of the carrier 10.

Pivoted between each of the pairs of projections 15, 16, 17 and 18 is a lever, these being designated 29, 30, 31 and 32 respectively. Each such lever has a short arm which is engaged within the adjacent hook on the adjacent closure member and a long arm which extends toward the opposite end of the carrier, there to be acted upon by one of the pins 33, 34, 35 or 36 carried respectively by the pistons 37, 38, 39 and 40. These pistons are mounted in radially extending cylindrical bores 41 and 42 in the carrier member. A liquid may be supplied to the space between the pistons in the upper bore 41 by means of the passage 43 through the hollow stem 11, and to the space between the pistons in the lower bore 42 by means of the passageway 44 leading from the upper bore to the lower bore.

Figures 2, 3:
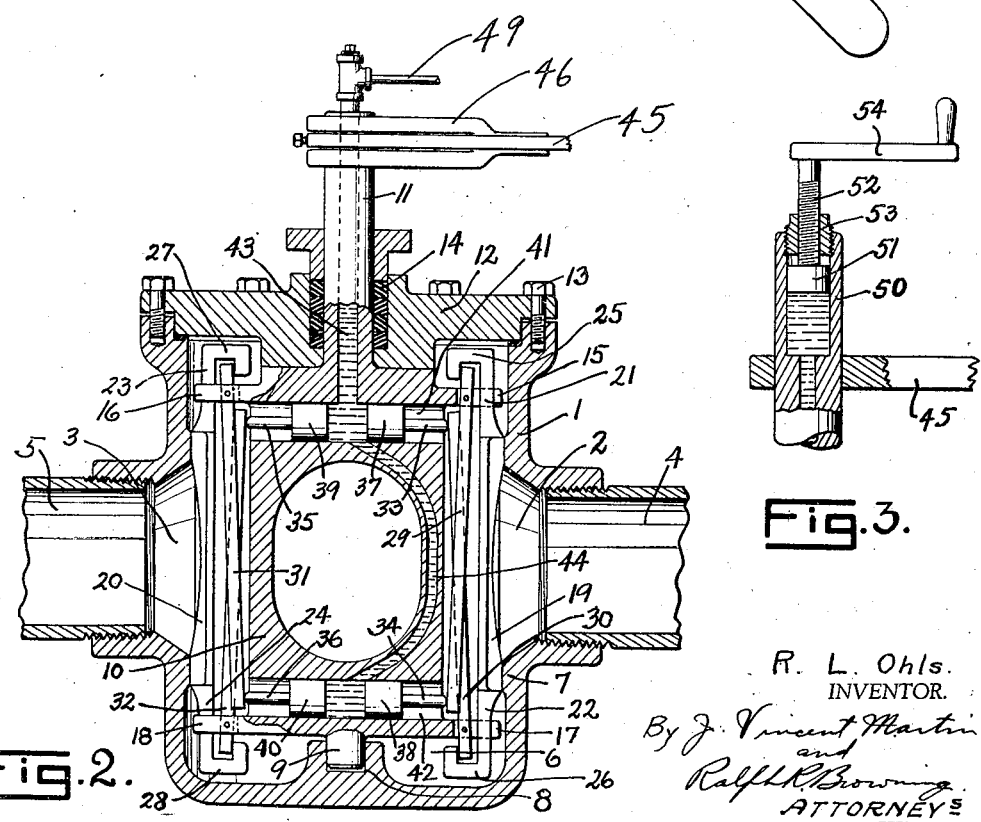
Fig. 2 is a longitudinal cross section through the valve illustrated in Fig. 1.
Fig. 3 is a longitudinal cross section through the upper portion of the valve stem of a slightly modified form of this invention.

In the form shown in Figs. 1 and 2, the valve stem 11 is adapted to be rotated by means of a lever 45 mounted thereon adjacent its upper end. There is a second lever 46 mounted on this stem so that it may rotate on the stem. To one of these levers is secured the cylinder 47 of a pump and to the other is secured the piston 48, which is adapted to operate in the cylinder 47. The interior of the cylinder 47 is connected by means of a conduit 49 with the upper end of the passage 43 through the hollow valve stem.

In operation, when it is desired to open the valve just described, the operator would grasp the levers 45 and 46 forcing the lever 46 toward the lever 45 and thus placing a pressure upon the liquid in the cylinder 47 forcing it through the conduit 49 and through the passages 43 and 44. This would cause the pistons 37, 38, 39 and 40 to all move in a radially outward direction and the pins 33, 34, 35 and 36 to act upon the levers 29, 30, 31 and 32 swinging them about their pivotal mountings. These levers in turn will act through the hooks 25, 26, 27 and 28 to positively move the closure segments inwardly toward the carrier and away from their respective seats. The closure segments now being freed from their seats by the positive pressure from the hydraulic system just described, the lever 45 may be employed to rotate the carrier and the segments to their open position. When in their open position, the lever 46 may be released and the closure members permitted to seat upon the wall of valve chamber 6 in the valve body, if desired, or the closure members may be kept in retracted position until the valve is again closed, whereupon a release of the lever 46 will permit the fluid to flow back into the cylinder 47 and will permit the closure members to seat again upon their respective seats.

In the modification illustrated in Fig. 3, the lever 46 and the pump made up of the cylinder 47 and the piston 48 are omitted and are replaced by a pump comprising a cylinder 50 formed in the upper end of the valve stem, a piston 51 movable upwardly and downwardly therein and carried on a rod 52, which is threaded through a nut 53. The rod 52 may be rotated by means of a crank 54 to cause it to move upwardly or downwardly and to carry the piston 51 upwardly or downwardly.

The operation of this form is very similar to that illustrated in Fig. 1, the only exception being that the pressure is placed upon the liquid by rotation of the crank 54 before the valve is moved to open position instead of by the movement of the lever 46. Likewise, the pressure on the liquid will be released by a reverse rotation of the crank 54 when it is desired to permit the closure members to again seat upon their seats.

It will be appreciated from the foregoing that a means has been provided whereby the closure members of a valve of the type referred to may be positively retracted even though they may be subjected to tremendous pressures tending to hold them upon their seats when closed. With the segments thus retracted, the valve may, of course, be moved to open position with a minimum of friction or resistance.

It will be appreciated further that the retraction of the closure members by the apparatus just described is positive and that the closure members may be fully retracted, if desired, before any movement of the valve toward open position takes place.

Having described my invention, I claim:

1. In a valve of the character described having a ported valve chamber, a closure member retractable from its seat and a carrier in the valve chamber for displacing the closure member to open and closed positions, fluid pressure actuated means in said carrier for retracting the closure member, said carrier having a stem extending to the exterior of the valve for operating the same, said carrier and stem having a fluid duct therein communicating with the fluid pressure actuated means, an operating handle fixed to said stem, a lever rotatably mounted on said stem, fluid compressing means interposed between said handle and lever, and a conduit placing the fluid compressing means in communication with said duct.

2. In a valve of the character described having a ported valve chamber, a closure member retractable from its seat and a carrier in the valve chamber for displacing the closure member to open and closed positions, fluid pressure actuated means in said carrier for retracting the closure member, said carrier having a stem extending to the exterior of the valve for operating the same, said carrier and stem having a fluid duct therein communicating with the fluid pressure actuated means, said stem having a piston receiving bore therein communicating with said duct, a piston in said bore, and means for displacing said piston.

3. In a valve of the character described having a ported valve chamber, a pair of closure members retractable from their seats and a carrier in said chamber for displacing the closure members to open and closed positions, said carrier having transverse bores adjacent its ends, a pair of pistons in each bore, means connecting one of each pair of pistons to each closure member for retracting the latter from their seats, a stem extending from the carrier to the exterior of the valve, said stem and carrier having ducts communicating with said bores, and means carried by the stem for applying pressure to fluid in said duct.

4. In a valve of the character described having a ported valve chamber and a closure member displaceable over said port to close and open the latter, a carrier rotatably mounted in said chamber for displacing said closure member, a stem rotatable with said carrier, said closure member being capable of radial movement relative to said carrier but rotatable therewith, a lever pivoted adjacent each end of said carrier, means connecting one end of each lever to said closure member, and fluid pressure actuated means disposed in said carrier for actuating the other end of each lever to retract said closure member from the wall of said chamber to facilitate displacement of said closure member by said carrier when rotated by said stem.

5. In a valve of the character described having a ported valve chamber and a closure member displaceable over said port to close and open the latter, a carrier rotatably mounted in said chamber for displacing said closure member, said carrier having a stem extending to the exterior of said valve for operating the same, said carrier and stem having a fluid duct therein communicating with fluid pressure actuated means disposed in said carrier, an operating handle fixed to said stem, a lever rotatably mounted on said stem, fluid compressing means interposed between said handle and said lever, a conduit placing said fluid compressing means in communication with said duct, said closure member being capable of radial movement relative to said carrier but rotatable therewith, a lever pivoted adjacent each end of said carrier, means connecting one end of each lever to said closure member, said fluid pressure actuated means actuating the other end of each lever when supplied with compressed fluid to retract said closure member from the wall of said chamber to facilitate displacement of said closure member by said carrier when rotated by said stem.

6. In a valve of the character described having a ported valve chamber, seats around said ports, a pair of closure members retractable from their seats and a carrier rotatably mounted in said chamber for displacing said closure members to open and closed positions, said closure members being capable of radial movement relative to said carrier but rotatable therewith, said carrier having transverse bores adjacent its ends, a pair of pistons in each bore, means connecting one of each pair of pistons to each closure member for retracting the latter from their seats, a stem extending from said carrier to the exterior of the valve, said stem and carrier having ducts communicating with said bores, and means carried by said stem for applying pressure to fluid in said duct.

7. In a valve of the character described having a ported valve chamber, seats around said ports, a pair of closure members retractable from their seats and a carrier rotatably mounted in said chamber for displacing said closure members to open and closed positions, said closure members being capable of radial movement relative to said carrier but rotatatble therewith, said carrier having transverse bores adjacent its ends, a pair of pistons in each bore, means connecting one of each pair of pistons to each closure member for retracting the latter from their seats, said means comprising a lever individual to each of said pistons each lever being pivoted to said carrier adjacent the end of said carrier, a stem extending from said carrier to the exterior of the valve, said stem and carrier having ducts communicating with said bores, and means carried by said stem for applying pressure to fluid in said duct.

ROBERT L. OHLS.